U S009280433B2

(12) United States Patent  (10) Patent No.: US 9,280,433 B2
Saretto et al.  (45) Date of Patent: Mar. 8, 2016

(54) HARDWARE DIAGNOSTICS AND SOFTWARE RECOVERY ON HEADLESS SERVER APPLIANCES

(75) Inventors: Cesare John Saretto, Seattle, WA (US); James C. Gray, Bellevue, WA (US); James M. Lyon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 503 days.

(21) Appl. No.: 13/349,925

(22) Filed: Jan. 13, 2012

(65) Prior Publication Data

US 2012/0117370 A1  May 10, 2012

Related U.S. Application Data

(62) Division of application No. 11/650,168, filed on Jan. 5, 2007, now abandoned.

(51) Int. Cl.
*G06F 11/22*  (2006.01)
*G06F 11/14*  (2006.01)
*G06F 21/57*  (2013.01)
*G06F 9/44*  (2006.01)

(52) U.S. Cl.
CPC ........ *G06F 11/2284* (2013.01); *G06F 11/1417* (2013.01); *G06F 21/575* (2013.01); *G06F 9/4401* (2013.01); *G06F 9/4406* (2013.01)

(58) Field of Classification Search
None
See application file for complete search history.

(56) References Cited

U.S. PATENT DOCUMENTS

| 5,195,130 | A | 3/1993 | Weiss et al. |
| 5,367,667 | A | 11/1994 | Wahlquist et al. |
| 5,398,333 | A | 3/1995 | Schieve et al. |
| 5,455,933 | A | 10/1995 | Schieve et al. |
| 5,594,663 | A | 1/1997 | Messaros et al. |
| 5,748,877 | A | 5/1998 | Dollahite et al. |
| 5,884,073 | A | 3/1999 | Dent |
| 5,978,912 | A | 11/1999 | Rakavy et al. |
| 6,112,243 | A | 8/2000 | Downs et al. |

(Continued)

FOREIGN PATENT DOCUMENTS

WO  01/39042 A2  5/2001

OTHER PUBLICATIONS

Brown et al.,"Embracing Failure:A Case for Recovery-Oriented Computing (ROC)", Date: 2001, 6 pages.

(Continued)

*Primary Examiner* — Backhean Tiv
(74) *Attorney, Agent, or Firm* — Henry Gabryjelski; Micky Minhas

(57) ABSTRACT

Described is a headless server appliance configured with a secondary actuation mechanism that when actuated, enters the headless server appliance into a diagnostic mode. For example, the diagnostic mode may correspond to a secondary operating system booted from a BIOS component activated by the secondary actuation mechanism. In the diagnostic mode, primitives may be communicated between a client device coupled (e.g., via a network or USB connection) to the headless server appliance, such as to provide the client device with access to the headless server appliance's hard disk. Other primitives, such as communicated via APIs, may provide the client device with access to the BIOS. The secondary operating system and/or client device may perform diagnostics and recovery operations on the headless server appliance. For example, the client device or similar source may restore or update the primary operating system image to a storage medium of the headless server appliance.

20 Claims, 5 Drawing Sheets

(56) References Cited

U.S. PATENT DOCUMENTS

Figure 1:
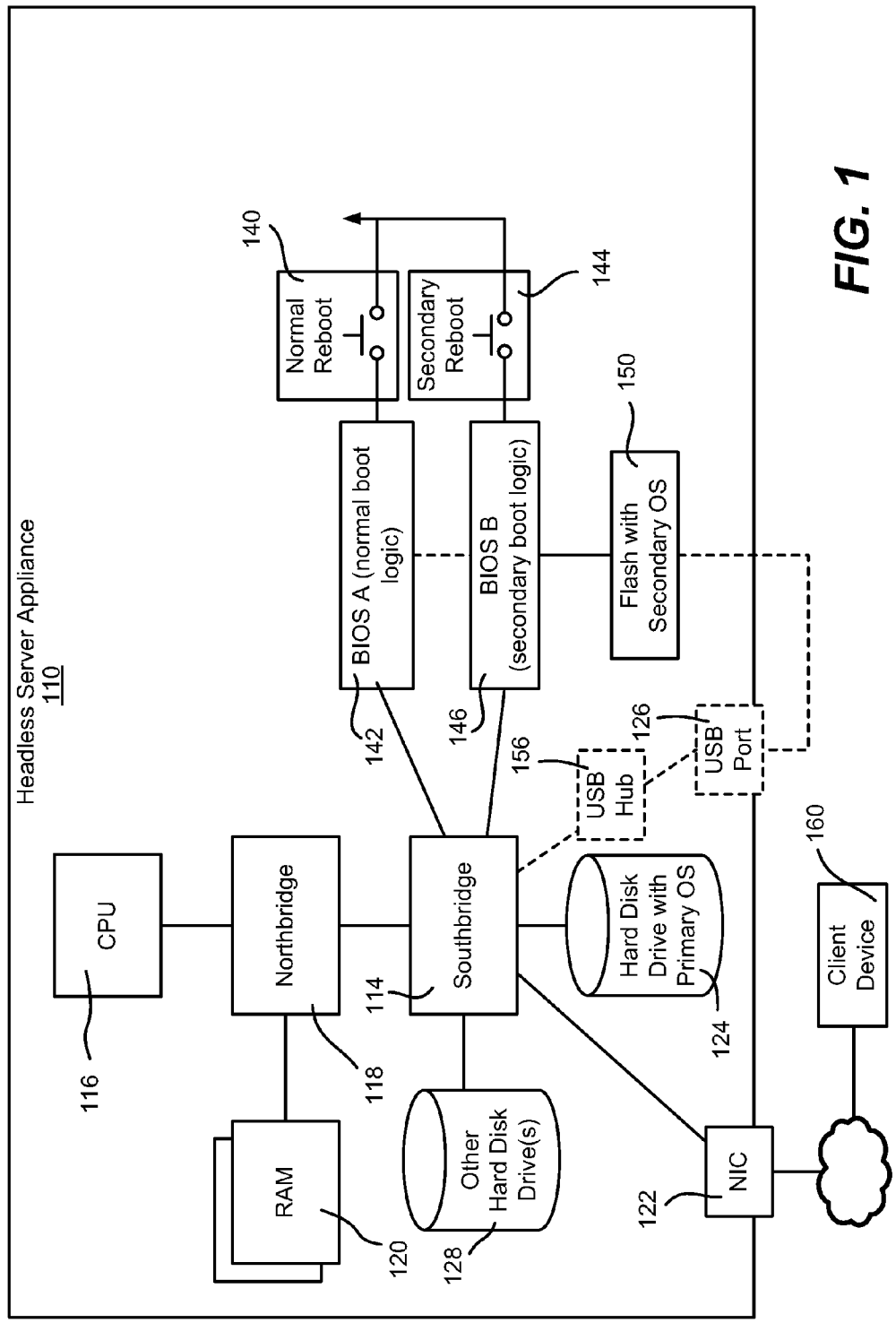
Figure 2:
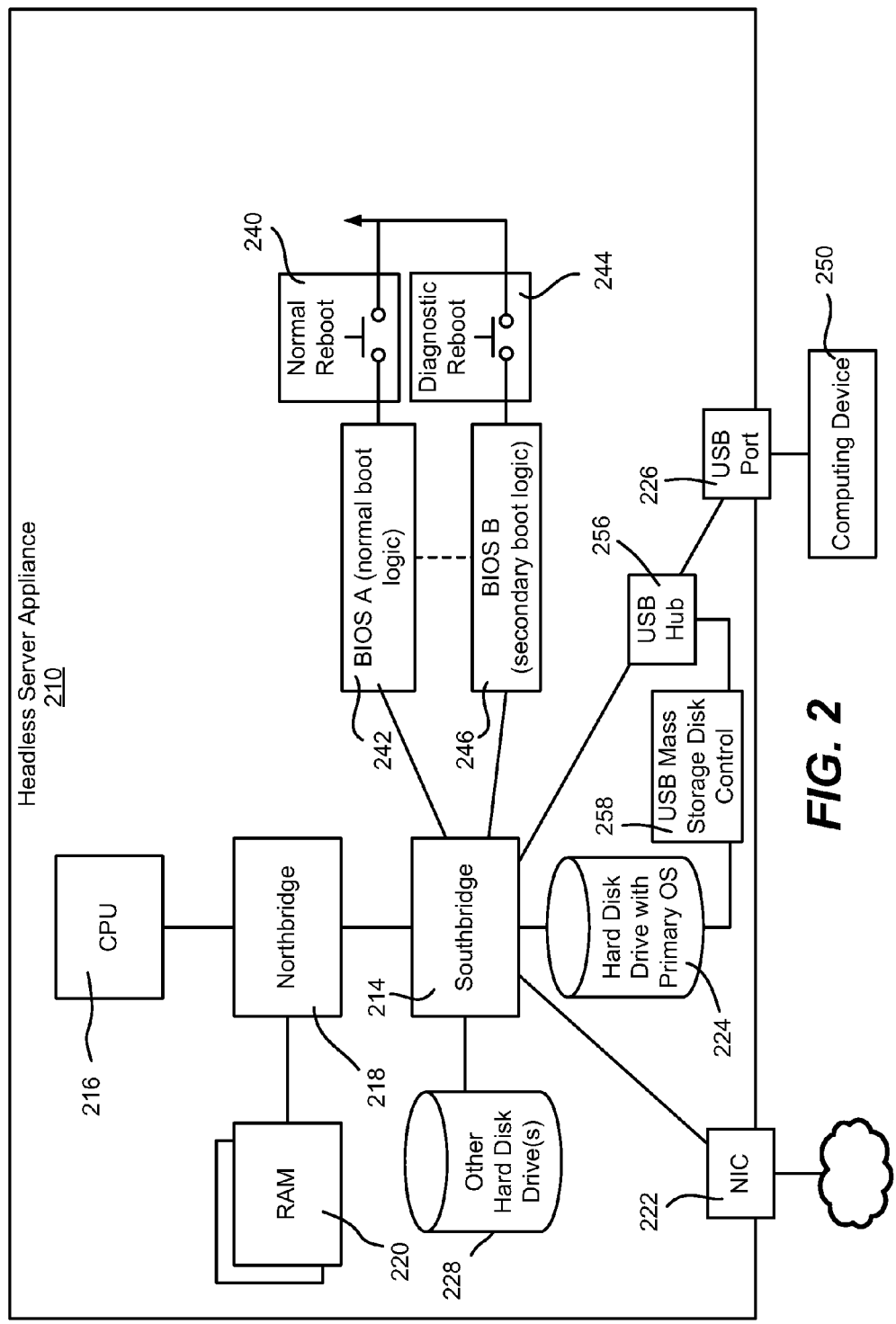
Figure 3:
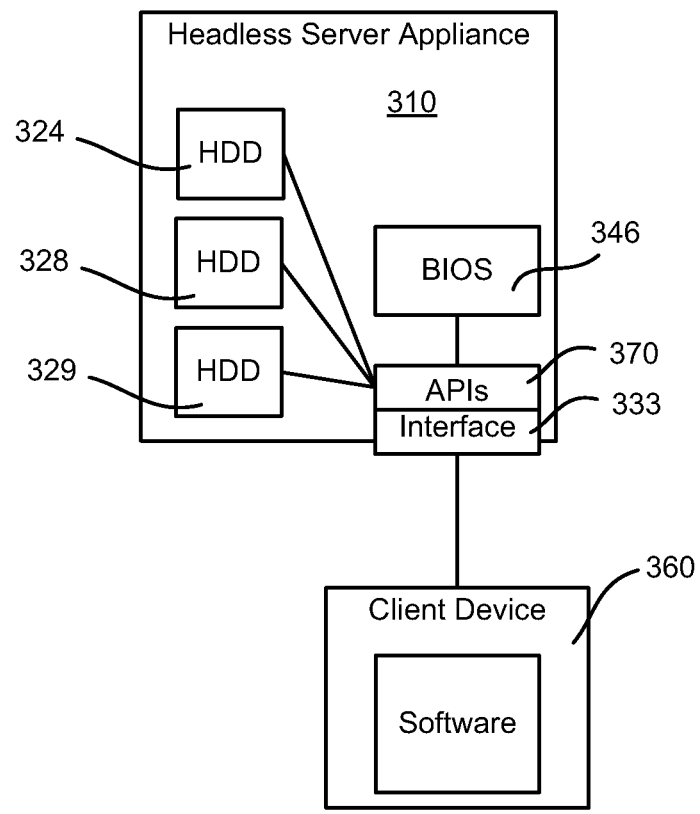
Figure 4:
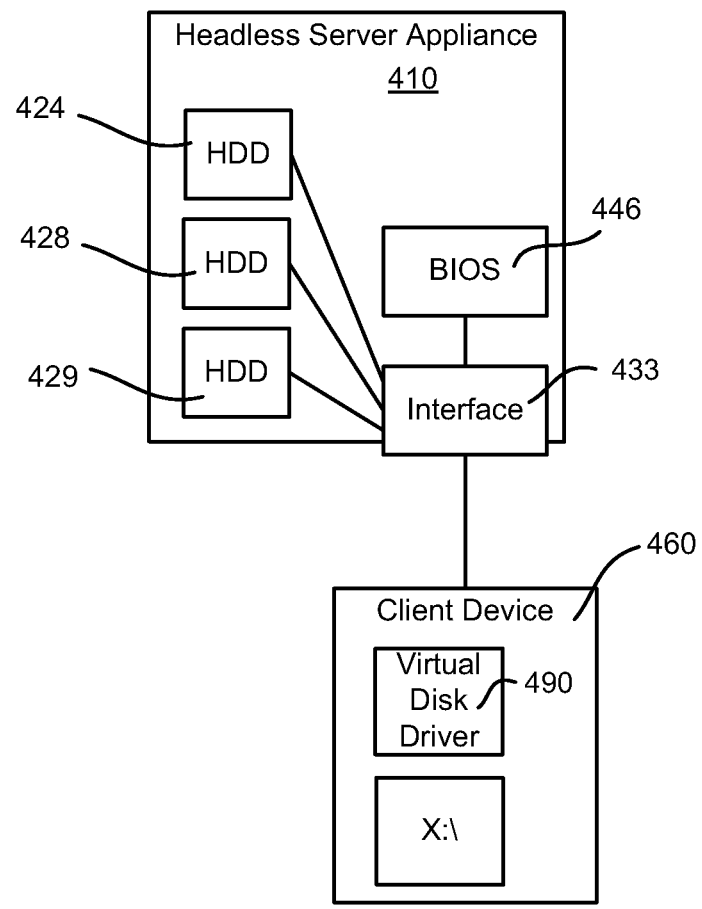
Figure 5:
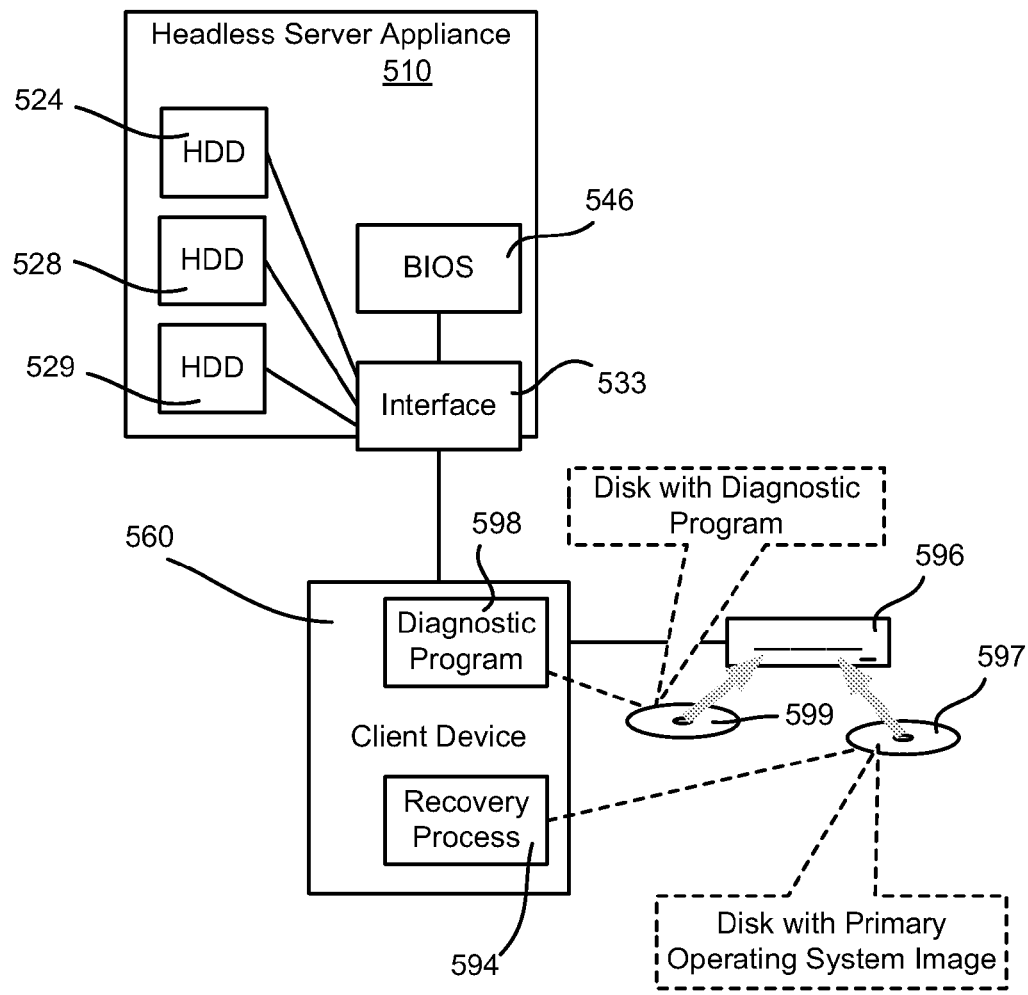

| | | |
|---|---|---|
| 6,347,375 B1 | 2/2002 | Reinert et al. |
| 6,438,711 B2 | 8/2002 | Woodruff |
| 6,697,962 B1 | 2/2004 | McCrory et al. |
| 6,732,301 B1 * | 5/2004 | Landry et al. .................. 714/43 |
| 6,754,811 B1 * | 6/2004 | Cato .................. G06F 9/4411 709/202 |
| 6,754,816 B1 | 6/2004 | Layton et al. |
| 6,763,456 B1 | 7/2004 | Agnihotri et al. |
| 6,779,016 B1 | 8/2004 | Aziz et al. |
| 6,782,408 B1 | 8/2004 | Chandra et al. |
| 6,785,807 B1 * | 8/2004 | Aguilar .................. G06F 9/4411 710/63 |
| 6,813,725 B1 * | 11/2004 | Hanes et al. .................. 714/2 |
| 6,813,733 B1 | 11/2004 | Li et al. |
| 6,823,476 B2 | 11/2004 | Williams et al. |
| 6,826,707 B1 | 11/2004 | Stevens |
| 6,826,715 B1 | 11/2004 | Meyer et al. |
| 6,836,750 B2 | 12/2004 | Wong et al. |
| 6,845,464 B2 * | 1/2005 | Gold .................. 714/6.11 |
| 6,880,002 B2 | 4/2005 | Hirschfeld et al. |
| 6,895,534 B2 | 5/2005 | Wong et al. |
| 6,920,553 B1 * | 7/2005 | Poisner .................. G06F 9/4401 713/1 |
| 6,922,791 B2 | 7/2005 | Mashayekhi et al. |
| 6,963,981 B1 | 11/2005 | Bailey et al. |
| 6,990,666 B2 | 1/2006 | Hirschfeld et al. |
| 7,013,462 B2 | 3/2006 | Zara et al. |
| 7,024,581 B1 | 4/2006 | Wang et al. |
| 7,058,826 B2 | 6/2006 | Fung |
| 7,058,858 B2 | 6/2006 | Wong et al. |
| 7,065,640 B2 | 6/2006 | Paul et al. |
| 7,076,633 B2 | 7/2006 | Tormasov et al. |
| 7,082,464 B2 | 7/2006 | Hasan et al. |
| 7,093,005 B2 | 8/2006 | Patterson |
| 7,124,289 B1 | 10/2006 | Suorsa |
| 7,127,625 B2 | 10/2006 | Farkas et al. |
| 7,131,026 B2 | 10/2006 | Denninghoff et al. |
| 7,131,123 B2 | 10/2006 | Suorsa et al. |
| 7,134,011 B2 | 11/2006 | Fung |
| 7,139,930 B2 | 11/2006 | Mashayekhi et al. |
| 7,143,420 B2 | 11/2006 | Radhakrishnan |
| 7,146,353 B2 | 12/2006 | Garg et al. |
| 7,152,109 B2 | 12/2006 | Suorsa et al. |
| 7,152,157 B2 | 12/2006 | Murphy et al. |
| 7,194,439 B2 | 3/2007 | Kassan et al. |
| 7,194,616 B2 | 3/2007 | Axnix et al. |
| 7,225,441 B2 | 5/2007 | Kozuch et al. |
| 7,231,410 B1 | 6/2007 | Walsh et al. |
| 7,257,584 B2 | 8/2007 | Hirschfeld et al. |
| 7,278,273 B1 | 10/2007 | Whitted et al. |
| 7,281,154 B2 | 10/2007 | Mashayekhi et al. |
| 7,302,608 B1 | 11/2007 | Acharya et al. |
| 7,313,573 B2 | 12/2007 | Leung et al. |
| 7,333,000 B2 | 2/2008 | Vassallo |
| 7,349,891 B2 | 3/2008 | Charron et al. |
| 7,350,068 B2 | 3/2008 | Anderson et al. |
| 7,350,186 B2 | 3/2008 | Coleman et al. |
| 7,356,679 B1 | 4/2008 | Le et al. |
| 7,366,888 B2 | 4/2008 | Dayan et al. |
| 7,386,761 B2 | 6/2008 | Abali et al. |
| 7,478,141 B2 | 1/2009 | Rothman et al. |
| 7,930,531 B2 * | 4/2011 | Chow et al. .................. 713/2 |
| 2002/0069369 A1 | 6/2002 | Tremain |
| 2003/0011807 A1 * | 1/2003 | Montierth .................. G06K 15/00 358/1.15 |
| 2004/0163011 A1 | 8/2004 | Shaw |
| 2004/0172578 A1 * | 9/2004 | Chen .................. G06F 11/1417 714/15 |
| 2004/0226010 A1 | 11/2004 | Suorsa |
| 2004/0267926 A1 | 12/2004 | Rothman et al. |
| 2005/0268175 A1 | 12/2005 | Park |
| 2006/0224794 A1 * | 10/2006 | Stevens .................. G06F 11/1417 710/62 |
| 2007/0043889 A1 * | 2/2007 | Sanada et al. .................. 710/62 |
| 2007/0162627 A1 | 7/2007 | Kim et al. |
| 2008/0052507 A1 * | 2/2008 | Chow .................. G06F 21/568 713/2 |
| 2008/0082813 A1 * | 4/2008 | Chow .................. G06F 21/34 713/2 |
| 2008/0168310 A1 * | 7/2008 | Saretto .................. G06F 11/2284 714/30 |
| 2009/0013165 A1 * | 1/2009 | Chow .................. G06F 9/4406 713/2 |

OTHER PUBLICATIONS

Norio Kurobane, "Rapidly Growing Linux OS: Features and Reliability", Date: Oct. 2005, retrived at http://www.fujitsu.com/downloads/MAG/vol41-3/paper08.pdf, pp. 318-322.

Oppenheimer et al., "ROC-1: Hardware Support for Recovery-Oriented Computing", IEEE Transactions on Computers, vol. 51, Issue 2, Feb. 2002, pp. 100-107.

International Search Report received for PCT Application No. PCT/US2007/089147, Mar. 25, 2008, 9 Pages.

* cited by examiner